(12) United States Patent
Lachaize et al.

(10) Patent No.: US 12,611,948 B2
(45) Date of Patent: Apr. 28, 2026

(54) DEVICE FOR CONTROLLING A DC-DC CONVERTER OF AN ONBOARD ELECTRICAL CHARGER

(71) Applicant: Vitesco Technologies GmbH, Regensburg (DE)

(72) Inventors: Jérôme Lachaize, Toulouse (FR); Renaud Clausin, Toulouse (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 697 days.

(21) Appl. No.: 18/022,832

(22) PCT Filed: Oct. 15, 2021

(86) PCT No.: PCT/EP2021/078580
    § 371 (c)(1),
    (2) Date: Feb. 23, 2023

(87) PCT Pub. No.: WO2022/089963
    PCT Pub. Date: May 5, 2022

(65) Prior Publication Data
    US 2023/0311683 A1    Oct. 5, 2023

(30) Foreign Application Priority Data
    Oct. 26, 2020    (FR) ...................................... 2010939

(51) Int. Cl.
    B60L 53/22        (2019.01)
    H02J 7/04        (2006.01)
    (Continued)

(52) U.S. Cl.
    CPC ................ B60L 53/22 (2019.02); H02J 7/04 (2013.01); H02J 7/90 (2026.01); H02M 1/36 (2013.01);
    (Continued)

(58) Field of Classification Search
    CPC ...................................................... B60L 53/22
    See application file for complete search history.

(56) References Cited

U.S. PATENT DOCUMENTS

2011/0199040 A1    8/2011    English et al.
2012/0176078 A1    7/2012    English et al.
                        (Continued)

OTHER PUBLICATIONS

Jackson, D.K., et al., "A Comparison of Multirate Digital Compensators for a Battery Charger", Computers in Power Electronics, IEEE Workshop, Portland, OR, Aug. 11-14, 1996, pp. 58-65, XP010239581.

(Continued)

*Primary Examiner* — Daniel Kessie
(74) *Attorney, Agent, or Firm* — Buchanan Ingersoll & Rooney PC

(57)        ABSTRACT
A control device for controlling a DC-DC converter of an electric charger for an electric or hybrid motor vehicle, including in particular a corrective controller, a harmonic compensator and a control unit configured so as, when the control device starts, to periodically send to the corrective controller and to the harmonic compensator a lower operating limit and an upper operating limit, each having an initial value imposing an output current of the DC-DC converter whose intensity is close to zero and less than 500 mA, and a ramp increase to control the oscillations of the control signal supplied by the control device to the DC-DC converter.

12 Claims, 3 Drawing Sheets

(51) Int. Cl.
    *H02J 7/90*         (2026.01)
    *H02M 1/36*      (2007.01)

(52) U.S. Cl.
    CPC ....... *B60L 2210/10* (2013.01); *H02J 2207/20*
                                    (2020.01)

(56)                References Cited

U.S. PATENT DOCUMENTS

2017/0117748 A1 *  4/2017  Mondal ..................... H02J 3/01
2018/0194236 A1 *  7/2018  Elshaer .................. B60L 53/12

OTHER PUBLICATIONS

Texas Instruments, "Fully Integrated Switch-Mode One-Cell Li-Ion Charger with Full USB Compliance and USB-OTG Support", Jan. 31, 2010, 44 pages, Retrieved from the Internet: https://www.ti.com/lit/ds/symlink/bq24150.pdf?ts=1625468096911&ref_url=https%3A%2F%2Fwww.ti.com%2Fproduct%FBQ24150 [retrieved on Jul. 5, 2021], XP055820812.
International Search Report and Written Opinion for International Application No. PCT/EP2021/078580, mailed Jan. 14, 2022, 11 pages.
International Search Report and Written Opinion for International Application No. PCT/EP2021/078580, mailed Jan. 14, 2022, 16 pages (French).

* cited by examiner

DEVICE FOR CONTROLLING A DC-DC CONVERTER OF AN ONBOARD ELECTRICAL CHARGER

CROSS REFERENCE TO RELATED APPLICATIONS

This application is the U.S. National Phase Application of PCT International Application No. PCT/EP2021/078580, filed Oct. 15, 2021, which claims priority to French Patent Application No. FR2010939, filed Oct. 26, 2020, the contents of such applications being incorporated by reference herein.

FIELD OF THE INVENTION

The present invention relates to the automotive field and more specifically to a device and a method for controlling the output current of a motor vehicle DC-DC converter.

The invention aims in particular to reduce the oscillations of the direct current supplied by a motor vehicle DC-DC converter.

BACKGROUND OF THE INVENTION

In an electric or hybrid motor vehicle, the recharging of the electrical battery system is carried out in a known manner using an onboard electric charger which can be connected to the domestic electricity grid via a socket. Such an electric charger converts the sinusoidal alternating current supplied by the domestic electricity grid into a direct current suitable for recharging the batteries of the system. From the point of view of the sinusoidal alternating current, the electric charger needs to behave like a resistor. Therefore, to charge the electrical battery system, it is necessary for the sinusoidal alternating current to be in phase with the sinusoidal supply voltage.

To this end, in a known manner, the electric charger comprises a current rectifier, a PFC circuit and a direct current to direct current, called "DC-DC", converter. The rectifier can be used to rectify the sinusoidal current so that the current at the output of the rectifier corresponds to the absolute value of the sinusoidal input current supplied by the domestic electricity grid. Next, the PFC (power factor correction) circuit adapts the phase of the current with the phase of the voltage of the domestic electricity grid and then transforms the rectified current into an averaged DC voltage, for example 400 V. Finally, the DC-DC converter converts the direct current supplied by the PFC circuit into a direct current whose intensity corresponds to that required by the battery system for its charging. The DC-DC converter has a dual function: to DC-isolate the electrical battery system from the domestic electricity grid and to control the current that is supplied to the electrical battery system.

In such a charger, the PFC regulates the voltage to an average value but nevertheless retains a sinusoidal component. Therefore, the input voltage of the DC-DC converter is not equal to 400 V but oscillates slightly around 400 V and these oscillations are found in the current supplied by the DC-DC converter to the battery system. However, supplying an oscillating current to the battery system can cause it to age prematurely. Thus, in order to guarantee the life of these lithium-ion batteries, these batteries must be charged with a direct current having light current oscillations whose frequency is lower than a predefined threshold, for example 20 Hz.

To meet this requirement, battery chargers for electric or hybrid motor vehicles use, in a known manner, a control device comprising a corrective controller coupled to a drive unit allowing a loop comprising a low-pass filter to be used to provide for regulation of the output current of the DC-DC converter. To this end, the corrective controller needs to be adjusted to operate according to the nature of the DC-DC converter, this adjustment being made by tailoring operating coefficients of the corrective controller to the characteristics of the DC-DC converter, in a manner known per se.

In addition, in order to ensure that the DC-DC converter operates within its control limits, for example between 150 and 300 kHz for a resonant converter controlled at variable frequency, the operation of the corrective controller is limited by a lower operating limit and an upper operating limit. During operation, the corrective controller generates a control signal on the basis of the value of the output current signal of the DC-DC converter and a current profile value requested by the battery system, observing the lower operating limit and the upper operating limit, and then transmits the control signal thus generated to the drive unit, which in turn generates a drive signal for the DC-DC converter of PWM (pulse width modulation) type or PFM (pulse frequency modulation) type.

In most known solutions, the topology of the DC-DC converter can be of two types: non-resonant with pulse width modulation control or resonant with pulse frequency modulation control, DC-DC converters of resonant with pulse frequency modulation control type exhibiting significantly higher efficiency than DC-DC converters of non-resonant with pulse width modulation control type. The use of a controller and a low-pass filter control loop proves to be satisfactory if the DC-DC converter is non-resonant with phase width modulation control but not if the DC-DC converter is resonant with pulse frequency modulation control. Indeed, in the latter case, it is necessary to increase the gain of the controller. This increase in gain can be attained through the adjustment of the controller but can then prove to be particularly complex, or even impossible in some cases, in order to manage to maintain the frequency of the oscillations of the output current of the DC-DC converter below the preset threshold.

In order to overcome this drawback, it is known practice to increase the gain of the controller by integrating a harmonic compensator in series or in parallel with the controller in order to obtain a so-called "resonant" controller allowing rejection of the low-frequency component of the current, this component being linked to the frequency of the electricity grid. The increase in gain afforded by the harmonic compensator can be used to increase the sensitivity of the controller without constraints on its adjustment and thus to maintain the stability of the loop.

However, when the charger starts, the variation of the control in the resonant controller can cause the harmonic compensator to be set into resonance, which can generate variations in the control signal supplied by the resonant controller to the drive unit and thus modify the duty cycle and/or the frequency of the drive signal sent by the drive unit to the DC-DC converter when the battery's charging cycle starts. However, such modifications can generate significant oscillations in the battery's charging current, which must therefore be avoided as mentioned above.

In order to counteract this resonance, it is known practice to slow down the operation of the control loop by adjusting the coefficients of the controller. When this is done, the response of the controller to reduce the oscillations becomes too slow in view of the constraints of safety and integration of the charger in the vehicle. Indeed, in a known manner, it is necessary to be able to stop the flow of current in the charger in the space of a few milliseconds for reasons of safety and consistency of operation with other equipment of the vehicle. In addition, the current profile required for charging the battery, which is supplied at the input of the controller, may no longer be accurately followed when the operation of the control loop is slowed down, which leads to non-optimized charging. There is therefore a need for a solution that can be used to at least partially overcome these drawbacks.

SUMMARY OF THE INVENTION

To this end, an aspect of the invention firstly relates to a device for controlling a DC-DC converter of an electric charger for an electrical battery system for an electric or hybrid motor vehicle, said device being remarkable in that it comprises:

a low-pass filter connected at the output of the DC-DC converter, a corrective controller, a subtractor configured to receive from the electrical battery system a current profile value to be applied and, via the low-pass filter, the value of the intensity of the output current of the DC-DC converter, to subtract the value of the filtered DC output current of the DC-DC converter from said received current profile value and to transmit the difference thus calculated to the corrective controller, a harmonic compensator connected at the output of said corrective controller, a control unit configured to provide each of said corrective controller and said harmonic compensator with the same lower operating limit and the same upper operating limit, a drive unit connected to the output of the harmonic compensator and configured to generate a drive signal on the basis of a control signal supplied by the harmonic compensator and to control the DC-DC converter on the basis of said generated drive signal, the low-pass filter, the subtractor, the corrective controller, the harmonic compensator, the control unit and the drive unit forming a control loop for regulating the DC output current of the DC-DC converter, the control unit being configured so as, when the control device starts, to periodically send, preferably in a period of duration greater than or equal to ten microseconds, more preferably in the order of 10 microseconds, to the corrective controller and to the harmonic compensator a lower operating limit and an upper operating limit, which is distinct from said lower operating limit, each characterized by an initial value imposing an output current of the DC-DC converter whose intensity is close to zero and less than 500 mA, that is to say between 0 and 500 mA, and by a ramp increase to control the oscillations of the control signal supplied by the control device to the DC-DC converter.

The rapid regulation of the current by the control device can be used to avoid the oscillations of the control when the charging cycle starts and therefore the limiting of the performance of the resonant controller, which is sufficiently reactive to allow the current profile required for charging the battery to be followed. As a result, the dynamics of the current regulation are guaranteed, as well as the reduction of low-frequency current oscillations during the charging cycle.

Preferably, the drive signal is of PFM or PWM type.

In one embodiment, the harmonic compensator is connected in series with the corrective controller.

In another embodiment, the harmonic compensator is connected in parallel with the corrective controller.

An aspect of the invention also relates to an electric charger comprising a current rectifier, a PFC circuit, a direct current to direct current, called "DC-DC", converter and a device for controlling said converter as presented above.

An aspect of the invention also relates to a motor vehicle comprising an electrical battery system and an electric charger as presented above.

An aspect of the invention also relates to a method for controlling a DC-DC converter of an electric charger as presented above, said method comprising the steps of:

when the electric charger and therefore the device start, at a time $t_0=0$ second, periodically sending, by way of the control unit, to the corrective controller and to the harmonic compensator, a lower operating limit and an upper operating limit, each characterized by an initial value imposing an output current of the DC-DC converter whose intensity is close to zero and less than 500 mA, that is to say between 0 and 500 mA, then sending, by way of the control unit, to the corrective controller and to the harmonic compensator, a lower operating limit and an upper operating limit periodically at short intervals, for example having a period greater than or equal to around ten microseconds, this period, called the sampling period, needing to be tailored to the dynamics of the system, by linearly increasing at least the value of said upper operating limit for each time interval in order to control the increase in the period of the control signal leaving the corrective controller in the form of a ramp.

Preferably, the control signal is of PFM or PWM type.

In one embodiment, the harmonic compensator is connected in series with the corrective controller.

In another embodiment, the harmonic compensator is connected in parallel with the corrective controller.

An aspect of the invention also relates to a computer program product characterized in that it comprises a set of program code instructions that, when executed by one or more processors, configure the processor or processors to implement a method as presented above.

BRIEF DESCRIPTION OF THE DRAWINGS

Further features and advantages of aspects of the invention will become more clearly apparent on reading the description that follows. This description is purely illustrative and should be read in conjunction with the appended drawings, in which.

DETAILED DESCRIPTION OF THE PREFERRED EMBODIMENTS

The device according to an aspect of the invention is intended to be installed in an electric charger, which is itself intended to be aboard a motor vehicle.

The device according to an aspect of the invention can be used to control a DC-DC converter of an electric charger for an electric or hybrid motor vehicle.

Such an electric charger is intended to be aboard an electric or hybrid motor vehicle comprising an electrical battery system in order to recharge the battery or batteries of said system.

Figure 1:
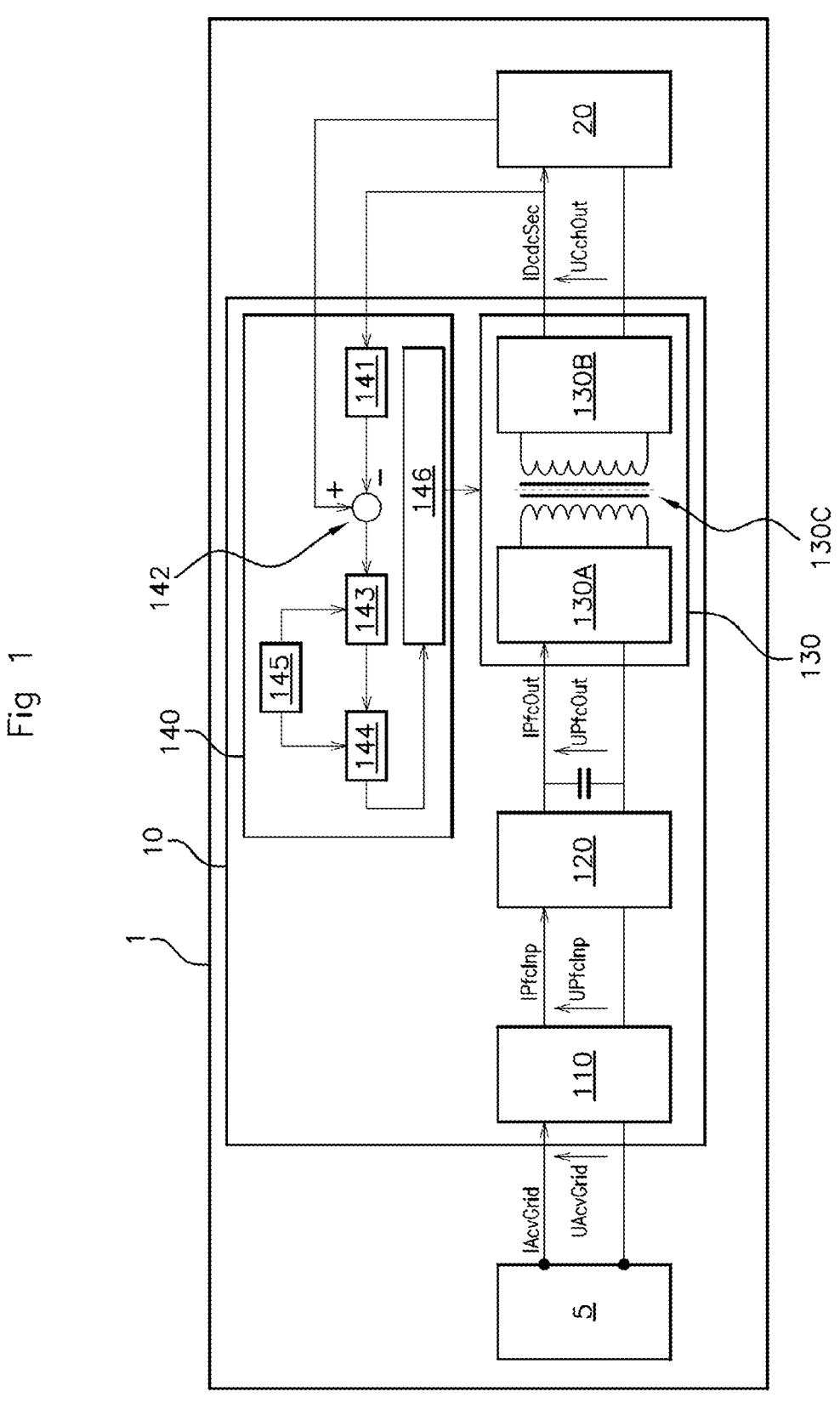
FIG. 1 schematically illustrates an embodiment in which the harmonic compensator is connected in series with the corrective controller.

FIG. 1 shows an example of an electric or hybrid vehicle 1 according to an aspect of the invention.

The vehicle 1 comprises an electric charger 10 and an electrical battery system 20. The electrical battery system 20 comprises one or more electrical batteries, in a manner known per se.

The electric charger 10 comprises a current rectifier 110, a PFC circuit 120, a direct current to direct current, called "DC-DC", converter 130 and a control device 140 for controlling said DC-DC converter 130.

The rectifier 110 can be used to rectify the sinusoidal current IAcvGrid supplied by a domestic electricity grid 5 (which generates a voltage UAcvGrid at the input of said domestic electricity grid 5) so that the output current IPfcInp of the rectifier 110 corresponds to the absolute value of the sinusoidal current IAcvGrid supplied by the domestic electricity grid 5.

The PFC (power factor correction) circuit 120 consumes a current in phase with the voltage UAcvGrid of the domestic electricity grid 5 and then transforms the rectified current IPfcInp into a direct current IPfcOut and into an averaged DC voltage UPfcOut, for example 400 V.

The DC-DC converter 130 converts the direct current IPfcOut supplied by the PFC circuit 120 into a direct current IDcdcSec whose intensity corresponds to that required by the electrical battery system 20 for its charging, the input voltage of the DC-DC converter 130 being denoted UChOut. The DC-DC converter 130 can thus be used to control the direct current IDcdcSec which is supplied to the electrical battery system 20. To this end, the DC-DC converter 130 comprises, in a manner known per se, a primary winding module 130A and a secondary winding module 130B. The DC-DC converter 130 also comprises a DC isolator 130C that can be used to DC-isolate the electrical battery system 20 from the domestic electricity grid 5.

The control device 140 forms a control loop for regulating the DC output current IDcdcSec of the DC-DC converter 130 and comprises a low-pass filter 141, a subtractor 142, a corrective controller 143, a harmonic compensator 144, a control unit 145 and a drive unit 146.

The low-pass filter 141 is connected firstly to the output of the DC-DC converter 130 and secondly at the input of the subtractor 142. The low-pass filter 141 passes the low frequencies and attenuates the high frequencies of the DC output current IDcdcSec of the DC-DC converter 130 in order to filter the chopping frequencies of the DC-DC converter 130.

The subtractor 142 is configured to receive from the electrical battery system 20 the current profile value needed by said electrical battery system 20 for its recharging at a given time. The subtractor 142 is configured to subtract the value of the filtered DC output current IDcdcSec of the DC-DC converter 130 from said received current profile value and to transmit the difference thus calculated to the corrective controller 143, thus allowing regulation of the DC output current signal IDcdcSec of the DC-DC converter 130.

Figure 2:
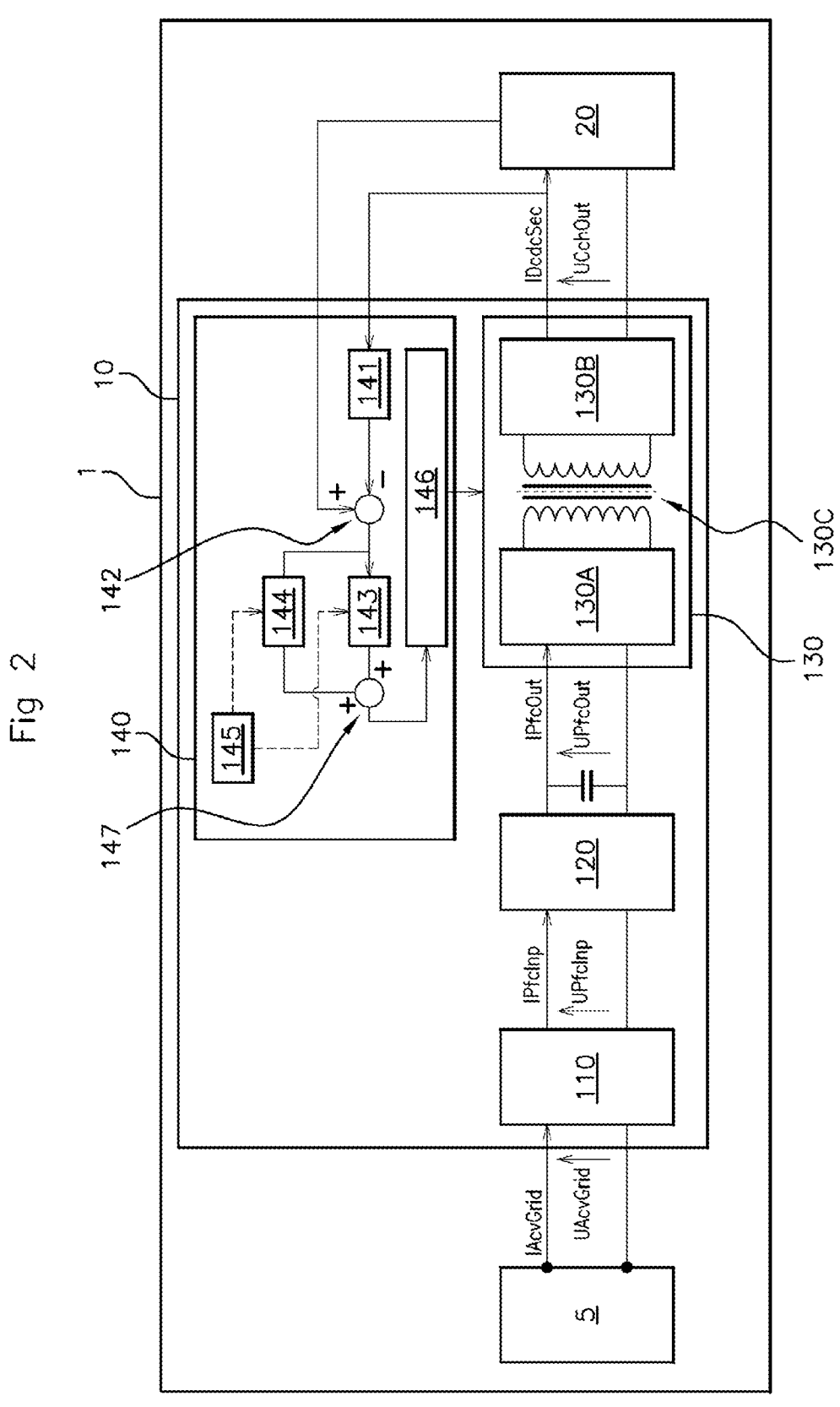
FIG. 2 schematically illustrates an embodiment in which the harmonic compensator is connected in parallel with the corrective controller.

The harmonic compensator 144 is electrically connected to the corrective controller 143 in series (by being placed after, as shown in FIG. 1) or in parallel (as shown in FIG. 2).

If the harmonic compensator 144 is electrically connected to the corrective controller 143 in parallel (FIG. 2), the control device 140 further comprises an adder 147 that can be used to add the signals from the corrective controller 143 and the harmonic compensator 144.

The control unit 145 is configured to periodically, for example every 10 μs, provide each of the corrective controller 143 and the harmonic compensator 144 with the same lower operating limit and the same upper operating limit. These limits represent the operating limits of the control variable in hertz for a PFM control or in % for a PWM control.

The drive unit 146 is configured to generate a drive signal, for example of PFM or PWM type, on the basis of a control signal supplied by the harmonic compensator 144 and to send the generated drive signal to the DC-DC converter 130 in order to control it.

The control unit 145 is configured so as, when the control device 140 starts, to periodically send to the corrective controller 143 and to the harmonic compensator 144 a lower operating limit and an upper operating limit characterized by an initial value imposing an intensity of the DC output current IDcdcSec of the DC-DC converter 130 close to 0 and less than 500 mA and a ramp increase R (FIG. 4) to control the oscillations of the control signal supplied by the control device 140 to the DC-DC converter 130.

Preferably, the device is implemented by a microcontroller capable of implementing a set of instructions that can be used to perform these functions, in particular those of the corrective controller 143 and of the harmonic compensator 144. The drive unit 146 can advantageously be a hardware component of said microcontroller.

Figure 3:
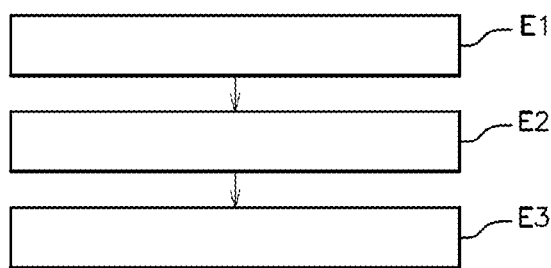
FIG. 3 illustrates an embodiment of the method according to the invention.

The implementation of an aspect of the invention will now be described with reference to FIGS. 3 to 5.

When the electric charger 10 and therefore the control device 140 start, at a time t0=0 second, the control unit 145 sends a lower operating limit and an upper operating limit imposing an intensity of the DC output current IDcdcSec of the DC-DC converter 130 close to zero and less than 500 mA (step E1).

Figure 4:
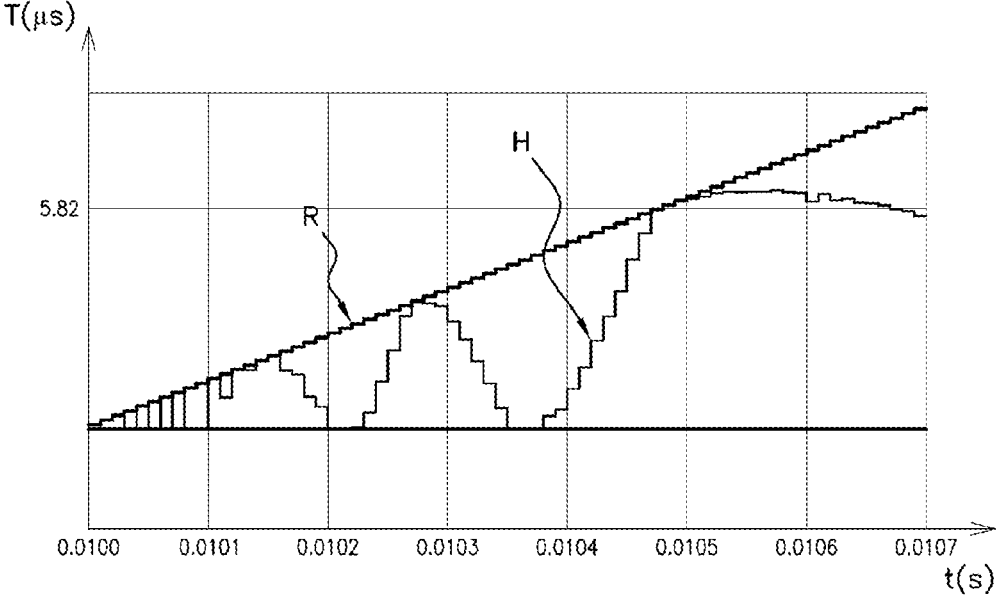
FIG. 4 illustrates an example of implementation of the method according to an aspect of the invention showing the trend in the period of sending of the lower and upper control limits as a function of time.

Next, the control unit 145 periodically sends an upper operating limit at short intervals, for example every 10 μs, by linearly increasing the value of said upper operating limit for each interval to control the increase in the period T of the control signal (upper operating limit) leaving the corrective controller 143 in the form of a ramp R, as illustrated in FIG. 4 (step E2). When this is done, the signal H from the harmonic compensator 144 will oscillate slightly in respect of period while being maintained under the ramp R, as illustrated in FIG. 4. Thus, the ramp R of the corrective controller 143 can be used to limit the oscillations produced by the harmonic compensator 144 when the control device 140 starts.

Once the oscillations of the signal H have been controlled (three oscillations in the example of FIG. 4), the harmonic compensator 144 ceases to resonate (step E3), so that it no longer generates oscillations in the signal of the DC output current IDcdcSec of the DC-DC converter 130. The control of the oscillations of the harmonic compensator 144 by the upper operating limit imposed on the corrective controller 143 proves to be relatively rapid, of the order of a few tenths of a microsecond, so that the control device 140 can satisfy the safety and integration conditions imposed by the installation of the electric charger 10 in the vehicle 1.

With an aspect of the invention, the stabilization of the control device 140 on starting can take place in a few milliseconds, as opposed to several tens of milliseconds with the closest prior art solution described in the preamble of the present application. An aspect of the invention can be used to impose time constraints on the corrective controller 143 and the harmonic compensator 144 during the transient period corresponding to the starting of the control device 140 so that the DC-DC converter 130 supplies a DC output current IDcdcSec whose sinusoidal component affects the electrical battery or batteries only within the accepted norm. Controlled starting allows time for the harmonic compensator 144 to stabilize. Since the control of the DC-DC converter 130 is governed, the corrective controller 143 can quickly and therefore faithfully follow the current profile required by the electrical battery system 20. An aspect of the invention can be used in particular to overcome the harmful effects of resonance which can be generated by the harmonic compensator 144 when the control device 140 starts, the oscillations being limited so that their effects do not impact on the output current of the DC-DC converter 130.

The invention claimed is:

1. A control device for controlling a DC-DC converter of an electric charger for an electrical battery system for an electric or hybrid motor vehicle, said control device comprising:
   a low-pass filter connected at the output of the DC-DC converter;
   a corrective controller;
   a subtractor configured to receive from the electrical battery system a current profile value to be applied and, via the low-pass filter, the value of the intensity of the output current of the DC-DC converter, to subtract the value of the filtered DC output current of the DC-DC converter from said received current profile value and to transmit the difference thus calculated to the corrective controller;
   a harmonic compensator connected at the output of said corrective controller;
   a control unit configured to provide each of said corrective controller and said harmonic compensator with the same lower operating limit and the same upper operating limit; and
   a drive unit connected to the output of the harmonic compensator and configured to generate a drive signal on the basis of a control signal supplied by the harmonic compensator and to control the DC-DC converter on the basis of said generated drive signal,
   the low-pass filter, the subtractor, the corrective controller, the harmonic compensator, the control unit, and the drive unit forming a control loop for regulating the DC output current of the DC-DC converter, the control unit being configured so as, when the control device starts, to periodically send to the corrective controller and to the harmonic compensator a lower operating limit and an upper operating limit, which is distinct from said lower operating limit, each having an initial value imposing an output current of the DC-DC converter whose intensity is between 0 and 500 mA, and by a ramp increase to control the oscillations of the control signal supplied by the control device to the DC-DC converter.

2. The control device as claimed in claim 1, wherein the drive signal is of PFM or PWM type.

3. The control device as claimed in claim 1, wherein the harmonic compensator is connected in series with the corrective controller.

4. The control device as claimed in claim 1, wherein the harmonic compensator is connected in parallel with the corrective controller.

5. An electric charger comprising a current rectifier, a PFC circuit, a direct current to direct current, called "DC-DC", converter and a control device for controlling said converter, as claimed in claim 1.

6. A motor vehicle comprising an electrical battery system and an electric charger as claimed in claim 5.

7. A method for controlling a DC-DC converter of an electric charger as claimed in claim 4, said method comprising:
   when the electric charger and therefore the control device start, at a time $t_0=0$ second, periodically sending, by way of the control unit, to the corrective controller and to the harmonic compensator, a lower operating limit and an upper operating limit, which is distinct from said lower operating limit, each characterized by an initial value imposing an output current of the DC-DC converter whose intensity is between 0 and 500 mA, then
   sending, by way of the control unit, to the corrective controller and to the harmonic compensator, a lower operating limit and an upper operating limit periodically by linearly increasing at least the value of said upper operating limit for each time interval in order to control the increase in the period of the control signal leaving the corrective controller in the form of a ramp.

8. The method as claimed in claim 7, wherein the drive signal is of PFM or PWM type.

9. The method as claimed in claim 7, wherein the harmonic compensator is connected in series or in parallel with the corrective controller.

10. A non-transitory computer program product, comprising a set of program code instructions that, when executed by one or more processors, configure the one or more processors to implement a method as claimed in claim 7.

11. The control device as claimed in claim 2, wherein the harmonic compensator is connected in parallel with the corrective controller.

12. The method as claimed in claim 8, wherein the harmonic compensator is connected in series or in parallel with the corrective controller.

* * * * *